United States Patent
Chu-Chia et al.

(10) Patent No.: US 6,834,975 B2
(45) Date of Patent: Dec. 28, 2004

(54) KEYPAD ILLUMINATING SYSTEM FOR A DATA PROCESSING DEVICE

(75) Inventors: Tsai Chu-Chia, Taipei Hsien (TW); Li Chien-Te, Taipei Hsien (TW); Lee Cheng-Chang, Taipei Hsien (TW); Hung Huang-Lung, Taipei Hsien (TW)

(73) Assignee: Wistron Corporation, Taipei (TW)

( * ) Notice: Subject to any disclaimer, the term of this patent is extended or adjusted under 35 U.S.C. 154(b) by 117 days.

(21) Appl. No.: 10/316,338

(22) Filed: Dec. 11, 2002

(65) Prior Publication Data

US 2004/0062033 A1 Apr. 1, 2004

(30) Foreign Application Priority Data

Sep. 26, 2002 (TW) .......................................... 091215255

(51) Int. Cl.[7] ......................................... F21W 131/403
(52) U.S. Cl. ............................ 362/84; 362/23; 200/314; 345/168
(58) Field of Search ............................ 345/168; 362/84, 362/23, 28; 40/543, 542; 200/314

(56) References Cited

U.S. PATENT DOCUMENTS

| | | | | |
|---|---|---|---|---|
| 5,477,430 A | * | 12/1995 | LaRose ........................ | 362/84 |
| 5,655,826 A | * | 8/1997 | Kouno et al. .................. | 362/24 |
| 5,793,358 A | * | 8/1998 | Petkovic et al. ............. | 362/287 |
| 6,658,773 B2 | * | 12/2003 | Rohne et al. .................. | 40/542 |

* cited by examiner

Primary Examiner—Laura K. Tso
(74) Attorney, Agent, or Firm—Woodard, Emhardt, Moriarty, McNett & Henry LLP

(57) ABSTRACT

A keypad illuminating system for a data processing device includes a keypad, a light source, and a photoluminescent substance. The light source is adapted to be mounted on the data processing device for illuminating the keypad. The photoluminescent substance is associated with the keypad for emitting visible light in response to the light emitted from the light source.

19 Claims, 4 Drawing Sheets

KEYPAD ILLUMINATING SYSTEM FOR A DATA PROCESSING DEVICE

CROSS-REFERENCE TO RELATED APPLICATION

This application claims priority of Taiwanese application No. 091215255, filed on Sep. 26, 2002.

BACKGROUND OF THE INVENTION

1. Field of the Invention

The invention relates to a keypad illuminating system, more particularly to a keypad illuminating system for a data processing device.

2. Description of the Related Art

As data processing devices, such as notebook computers, have become more popular and more portable, users of the data processing devices now operate their devices in many different locations. However, in locations where there is insufficient background light for keyboard operation, such as in airplanes and the like, the lack of adequate lighting may affect the user's ability to work efficiently. Therefore, it has been attempted in the art to provide improved keyboard illumination.

U.S. Pat. No. 6,040,822 disclosed an illuminated keypad system, which includes a light source within a panel for illuminating the panel, and a window for allowing a portion of the light from the light source to illuminate keypads. Since there is a relatively large angle between the light source and the keypads, it is difficult to project a sufficient amount of light onto the keypads to achieve a proper illumination effect. Furthermore, it is difficult for the user to recognize the exact position of a desired keypad due to a shadow effect resulting from the relatively large reflection angle of the light and due to a relatively large amount of light reflected from the housing and the keypads.

U.S. Pat. No. 6,161,944 disclosed a retractable illumination device to illuminate a keyboard in a dimly lit environment. The illumination device maybe located proximate to the keyboard or on a display. However, if the illumination device is located below the display, it may suffer from the aforesaid disadvantages. If the illumination device is located on the display, the light from the illumination device may interfere with the viewing of the display.

U.S. Pat. No. 6,191,939 disclosed an information handling system which utilizes a reflective material disposed on an upper section of a housing of the information handling system to redirect light emanating from the display of the information handling system onto a portion of the housing requiring illumination, such as a keyboard. However, in addition to the aforesaid disadvantages, it is difficult to recognize the keypads since the amount of the light emanating from the display depends on the information shown on the display and is accordingly unstable. Furthermore, since the amount of the light emanating from the display is relatively small, a sufficient illumination effect can not be obtained.

Since visible light is used as the light source in the prior art, the aforesaid disadvantages may result from the limitations of the quality and the location of the light source.

SUMMARY OF THE INVENTION

Therefore, it is an object of the present invention to provide a keypad illuminating system for a data processing device, which provides a sufficient illumination effect for clear recognition of keypads in an environment having a low level of ambient light.

It is another object of the present invention to provide a keyboard for a data processing device, the keyboard having keypads capable of emitting visible light.

It is yet another object of the present invention to provide a data processing device, which includes the keypad illuminating system of the present invention.

The keypad illuminating system for a data processing device according to one aspect of this invention includes a keypad, a light source adapted to be mounted on the data processing device for illuminating the keypad, and a photoluminescent substance associated with the keypad for emitting visible light in response to the light emitted from the light source.

The keyboard for a data processing device according to another aspect of this invention includes a plurality of keypads, each of which is provided with a photoluminescent substance thereon for emitting visible light in response to light emitted by a light source on the data processing device.

The data processing device according to yet another aspect of this invention includes a display unit and a body. The display unit has a light source emitting light within a predetermined range of wavelength. The body connects to the display unit, and has a keyboard. The keyboard includes a plurality of keypads, each of which is provided with a photoluminescent substance thereon for emitting visible light in response to the light emitted from the light source.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Before the present invention is described in greater detail with reference to the preferred embodiments, it should be noted that like elements are denoted by the same reference numbers in the following description.

Figure 1:
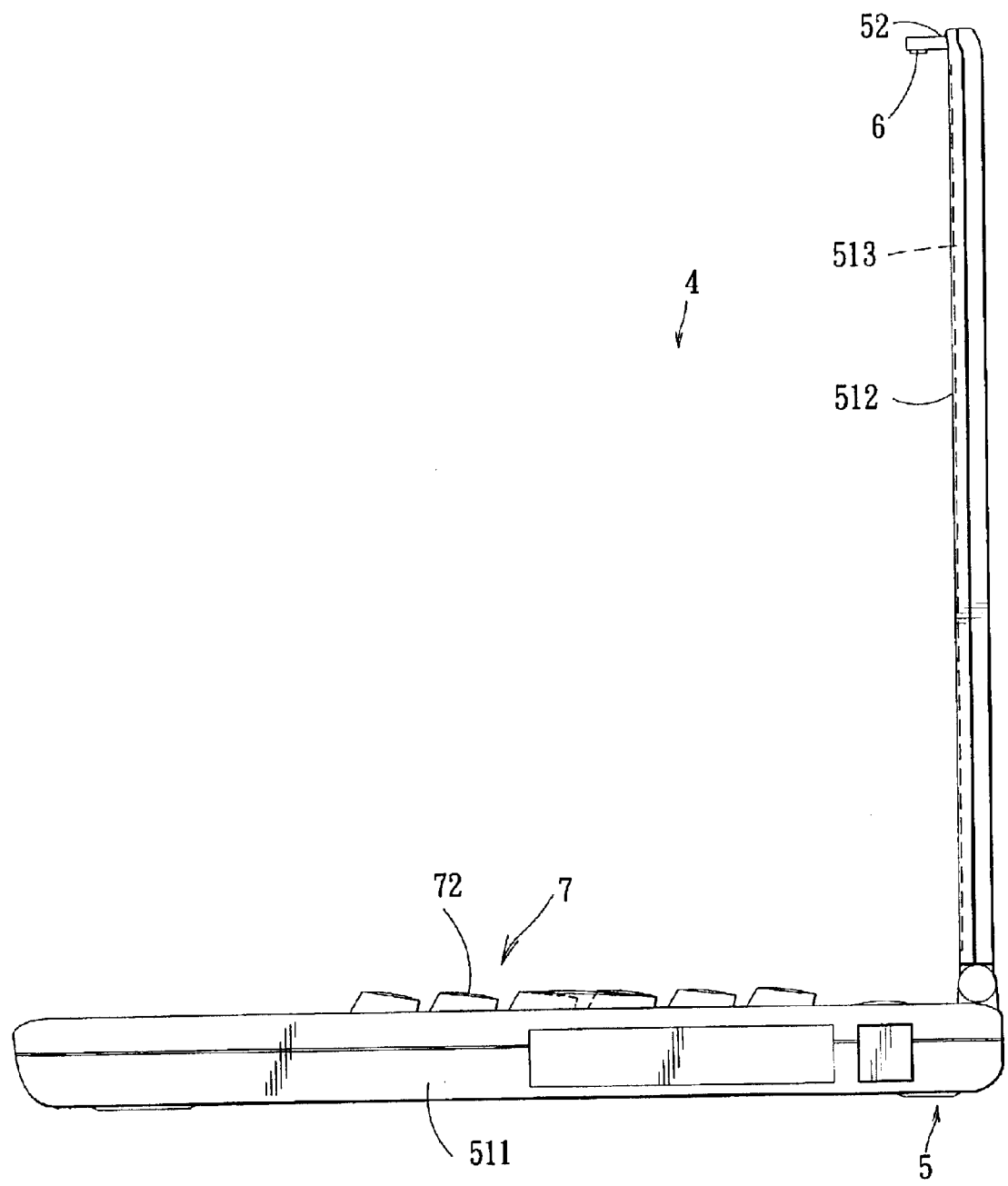
FIG. 1 is a side view of a keypad illuminating system for a data processing device according to this invention.

Referring to FIG. 1, the preferred embodiment of a keypad illuminating system 4 for a data processing device 5 according to this invention is shown to include a plurality of keypads 7, a light source 6 adapted to be mounted on the data processing device 5 for illuminating the keypads 7, and a photoluminescent substance 72 associated with the keypads 7 for emitting visible light in response to the light emitted from the light source 6. In the preferred embodiment, the data processing device 5 is embodied in a notebook computer. However, the keypad illuminating system can be applied to other data processing devices, such as personal digital assistants, projectors, electronic instruments, and the like.

The data processing device 5 includes a display unit 512 and a body 511 connected pivotally to the display unit 512. The display unit 512 has a display monitor 513. The body 511 includes a keyboard that is constituted by the keypads 7. Each of the keypads 7 has a top face inclined relative to a horizontal plane and gradually decreasing in height toward the display unit 512 from one end of the top face away from the display unit 512.

Figure 2:
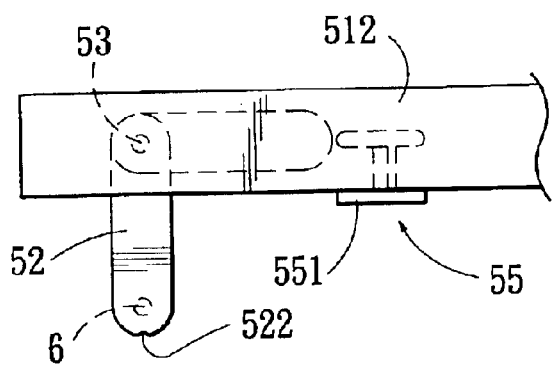
FIG. 2 is a fragmentary schematic view showing an arm member of the preferred embodiment in a protruding position.
Figure 3:
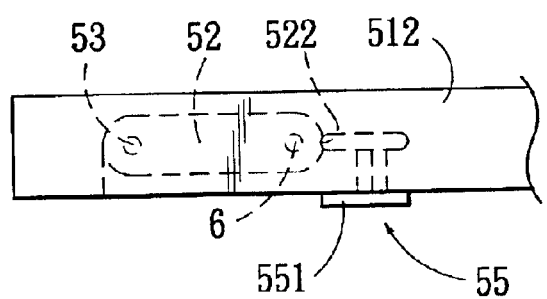
FIG. 3 is a fragmentary schematic view showing the arm member in a folded position.
Figure 4:
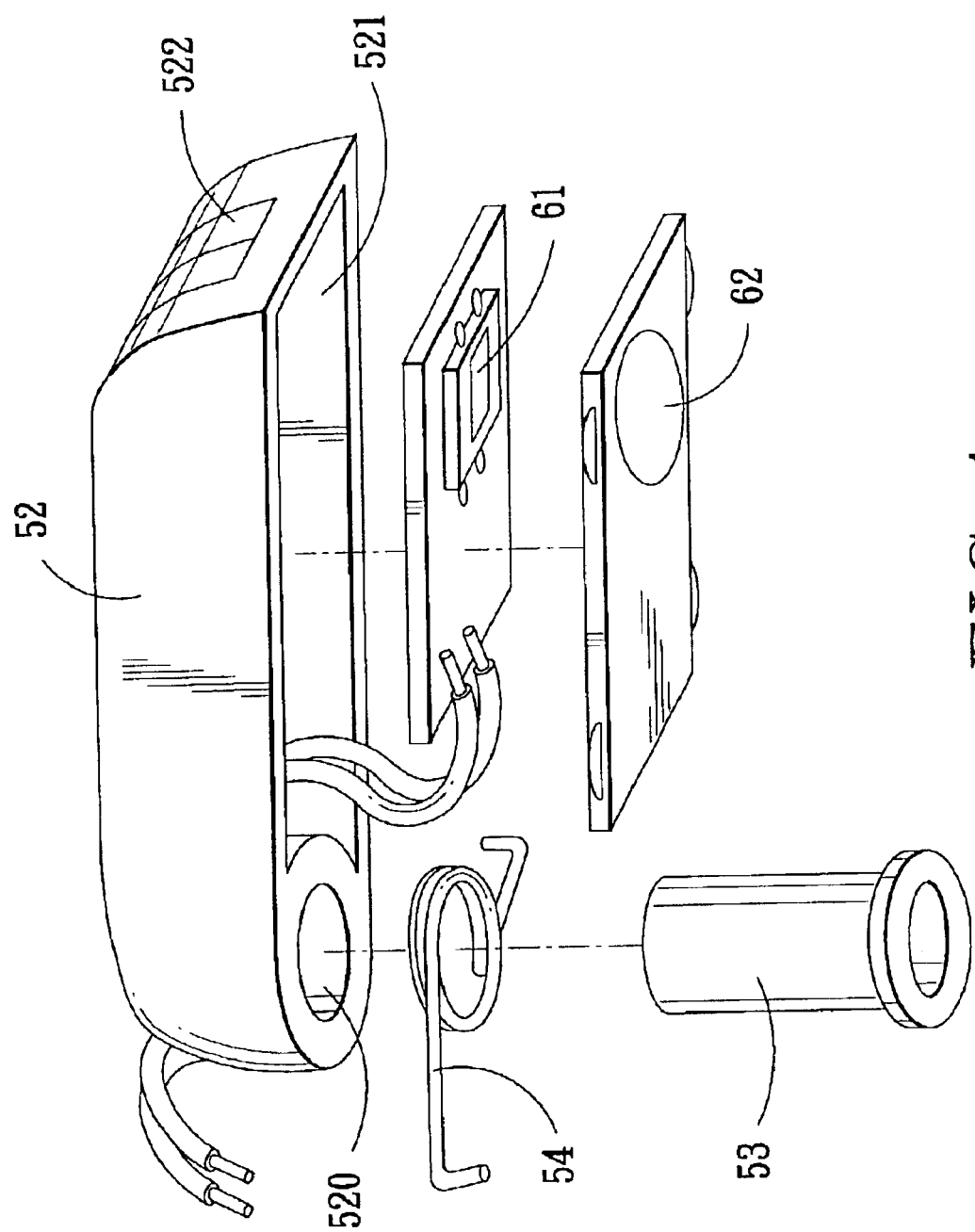
FIG. 4 is an fragmentary exploded perspective view of the preferred embodiment.

Referring to FIGS. 2, 3 and 4, the data processing device 5 further includes an arm member 52 mounted on the display unit 512. The light source 6 is mounted on the arm member 52, and emits light within a predetermined range of wavelength. The arm member 52 is rotatable relative to the display unit 512 between a protruding position (as shown in FIG. 2), in which the arm member 52 protrudes from the display unit 512 and in which the light source 6 is turned on so as to illuminate the keypads 7, and a folded position (as shown in FIG. 3), in which the arm member 52 is received by the display unit and in which the light source 6 is turned off. Moreover, the data processing device 5 further includes a shaft 53 for pivotally rotating the arm member 52 between the protruding position and the folded position, a resilient member 54 for resiliently connecting the arm member 52 to the shaft 53, and a locking assembly 55 for locking releasably the arm member 52 in the folded position. The arm member 52 is formed with a hole 520 for receiving an end portion of the shaft 53, and recess 521 adjacent to the hole 520. The light source 6 is mounted in the recess 521 of the arm member 52. The locking assembly 55 includes a locking member 551 mounted on the display unit 512, and a stop recess 522 formed in the arm member 52 and spaced apart from the hole 520. When the locking member 551 is moved away from the stop recess 522, the resilient member 54, such as a spiral spring, biases the arm member 52 from the folded position to the protruding position. The actual configuration of the resilient member 54 can vary as long as it can bias the arm member 52 from the protruding position to the folded position.

In the preferred embodiment, the arm member 52 is mounted on the display unit 512. It should be understood that the arm member 52 can be mounted on other positions of the data processing device 5 provided that the light from the light source 6 can properly illuminate the keypads 7. Furthermore, movement of the arm member 52 between the protruding position and the folded position can be performed using any other suitable design well known in the art, such as by folding or by stretching.

The light source 6 is preferably an ultraviolet light source, such as an ultraviolet lamp containing a mercury vapor. In the preferred embodiment, the light source 6 includes a low-power diode 61, which radiates ultraviolet light with a wavelength ranging from 200 nm to 400 nm, and which is mounted within the recess 521 of the arm member 52. A lens 62 is mounted on the arm member 52 for adjusting the illuminating area of the emitted light so as to properly illuminate all of the keypads 7 when the arm member 52 is in the protruding position.

Each of the keypads 7 is provided with the photoluminescent substance 72 for emitting visible light in response to the ultraviolet light emitted from the light source 6. In the preferred embodiment, the photoluminescent substance 72 is a material which can emit visible light with a wavelength ranging from 400 nm to 800 nm in response to the ultraviolet light with a wavelength ranging from 200 nm to 400 nm emitted from the light source 6. The photoluminescent substance 72 is a material containing phosphor powder, and one example is Glowbug Phosphor H4 powder available from Glowbug Company. The Glowbug Phosphor H4 powder primarily contains doped aluminum oxide. Of course, other suitable photoluminescent substances well known in the art may be used in the practice of this invention. The photoluminescent substance 72 can be formed as a coating provided on the keypads 7 for symbols. Alternatively, the photoluminescent substance 72 can be blended into the plastic material for making the keypads 7, or can be applied over blank areas on the top surface of the keypads 7, e.g., background of the symbols on the keypads 7.

Figure 5:
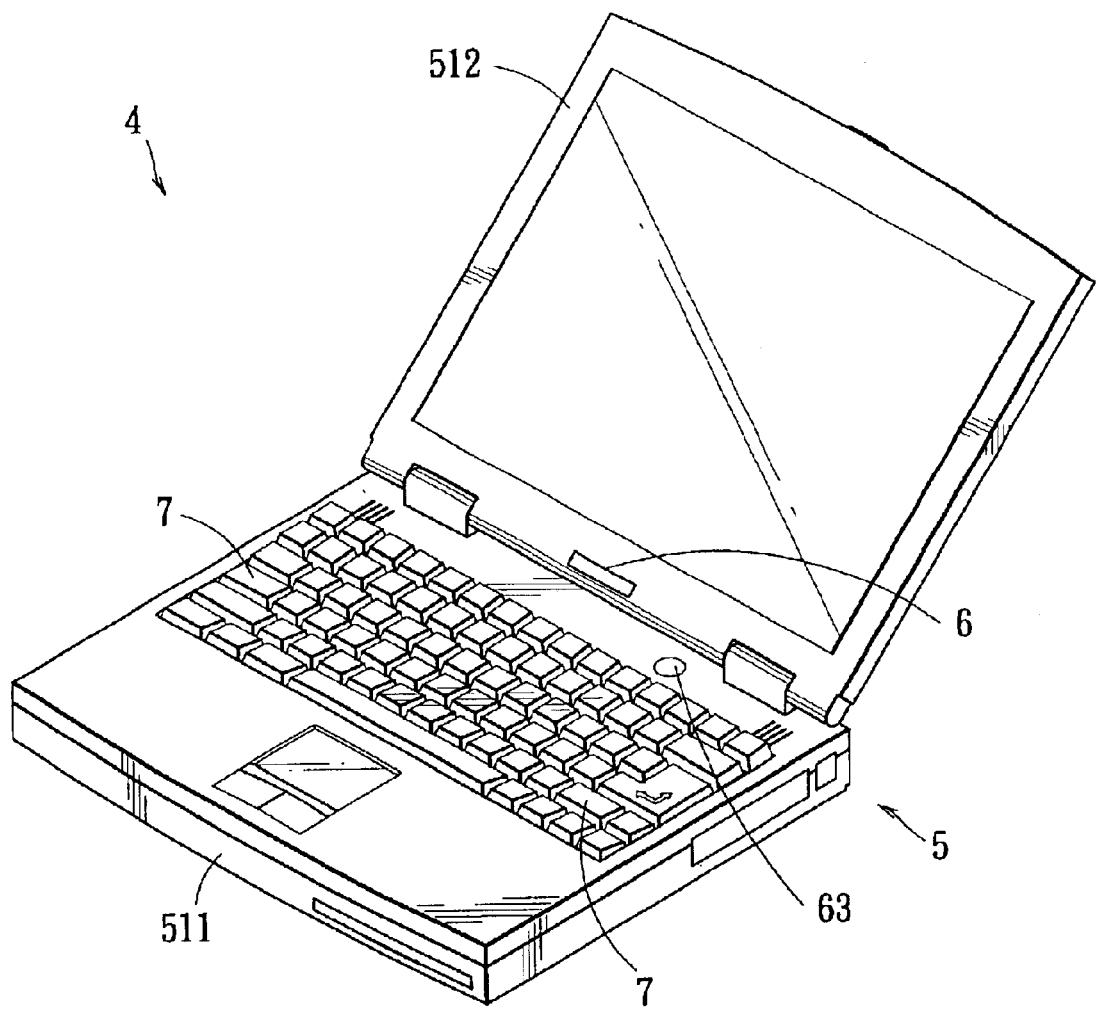
FIG. 5 is a perspective view of another preferred embodiment of a keypad illuminating system according to this invention.

FIG. 5 illustrates another preferred embodiment of a keypad illuminating system 4 for a data processing device 5 according to this invention. The configuration of the present embodiment is similar to that of the foregoing embodiment, except that the light source 6 is mounted directly on the display unit 512, and that the keypad illuminating system 4 is further provided with a switch 63 on the body 511 for actuating the light source 6. It should be understood that the light source 6 may be mounted directly on any suitable position on the body 511 provided that the light from the light source 6 can properly illuminate the keypads 7.

In view of the aforesaid, since illumination of the keypads 7 is possible through the photoluminescent substance 72 which emits visible light in response to the light emitted from the ultraviolet light source 6, the disadvantages of the prior art, which arise from the reflection of visible light, can be overcome.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A keypad illuminating system for a data processing device, comprising:
   a keypad;
   a light source adapted to be mounted on the data processing device for directing non-visible light toward said keypad; and
   a photoluminescent substance associated with said keypad for emitting visible light in response to said non-visible light emitted from said light source.

2. The keypad illuminating system as claimed in claim 1, wherein said light source is an ultraviolet light source.

3. The keypad illuminating system as claimed in claim 1, wherein said light source emits light with a wavelength ranging from 200 nm to 400 nm.

4. The keypad illuminating system as claimed in claim 1, wherein said photoluminescent substance is formed as a coating that is provided on said keypad.

5. The keypad illuminating system as claimed in claim 4, wherein said coating includes phosphor powder.

6. The keypad illuminating system as claimed in claim 1, wherein said keypad is made of a plastic material including said photoluminescent substance.

7. The keypad illuminating system as claimed in claim 1, wherein said light source is an ultraviolet lamp containing a mercury vapor.

8. The keypad illuminating system as claimed in claim 1, wherein said light source is a diode that radiates ultraviolet light.

9. A keyboard for a data processing device, the data processing device including a light source emitting non-visible light, said keyboard comprising:

a plurality of keypads, each of which is provided with a photoluminescent substance thereon for emitting visible light in response to said non-visible light emitted from the light source.

10. The keyboard as claimed in claim 9, wherein the light source is an ultraviolet light source.

11. The keyboard as claimed in claim 9, wherein said photoluminescent substance is a coating that is provided on said keypads.

12. The keyboard as claimed in claim 9, wherein said keypads are made of a plastic material incorporating said photoluminescent substance.

13. A data processing device, comprising:

a display unit including a light source emitting non-visible light; and a body connecting to said display unit, and including a keyboard, said keyboard including a plurality of keypads, each of which is provided with a photoluminescent substance thereon for emitting visible light in response to said non-visible light emitted from said light source.

14. The data processing device as claimed in claim 13, wherein said light source is an ultraviolet light source.

15. The data processing device as claimed in claim 13, wherein said photoluminescent substance is a coating that is provided on said keypads.

16. The data processing device as claimed in claim 13, wherein said keypads are made of a plastic material incorporating said photoluminescent substance.

17. The data processing device as claimed in claim 13, wherein each of said keypads has a top face inclined relative to a horizontal plane and gradually decreasing in height toward said display unit from one end of said top face away from said display unit.

18. A data processing device, comprising:

a display unit including a light source emitting light within a predetermined range of wavelength;

a body connecting to said display unit, and including a keyboard, said keyboard including a plurality of keypads, each of which is provided with a photoluminescent substance thereon for emitting visible light in response to the light emitted from said light source; and an arm member mounted on said display unit, said light source being mounted on said arm member, said arm member being rotatable relative to said display unit between a protruding position, in which said arm member protrudes from said display unit and in which said light source is turned on to illuminate said keypads, and a folded position, in which said arm member is received by said display unit and in which said light source is turned off.

19. The data processing device as claimed in claim 18, further comprising a shaft for pivotally rotating said arm member between said protruding position and said folded position.

* * * * *